Jan. 5, 1932. R. STRESAU 1,839,448

PIPE THREAD PROTECTOR

Filed Nov. 3, 1927

WITNESS:
Fred Palm
DEL.

INVENTOR.
RICHARD STRESAU
BY
Erwin, Wheeler & Woodland
ATTORNEYS.

Patented Jan. 5, 1932

1,839,448

UNITED STATES PATENT OFFICE

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK

PIPE THREAD PROTECTOR

Application filed November 3, 1927. Serial No. 230,717.

The invention relates to an improved device in simple form for protecting the threaded end of a pipe, to prevent damage thereto in transportation, or while being handled. The construction and manner of application of the thread protector are such that it also functions effectively in excluding moisture, dirt and sand from access to the threads, and prevents injury from these causes.

The invention comprises a thin metal shell which is adapted to be placed about the threaded ends of a pipe, but is separated therefrom by an intermediate lining of soft metal, such as sheet lead, the sheet of soft metal being brought into intimate engagement with the threaded end of the pipe, and compressed while in that position so as to receive a counter-thread by force of its contact with the threads on the end of the pipe. By means of the engagement thus effected, the thread protector is held in position upon the end of the pipe.

The thread protector is provided upon its outer surface with a plurality of axially extending ribs, through which the thread protector may be easily unscrewed from the pipe, or restored thereto.

Details of the constructional features of the invention will now be more fully described, and the novelty thereof pointed out in the appended claims.

Figure 1:
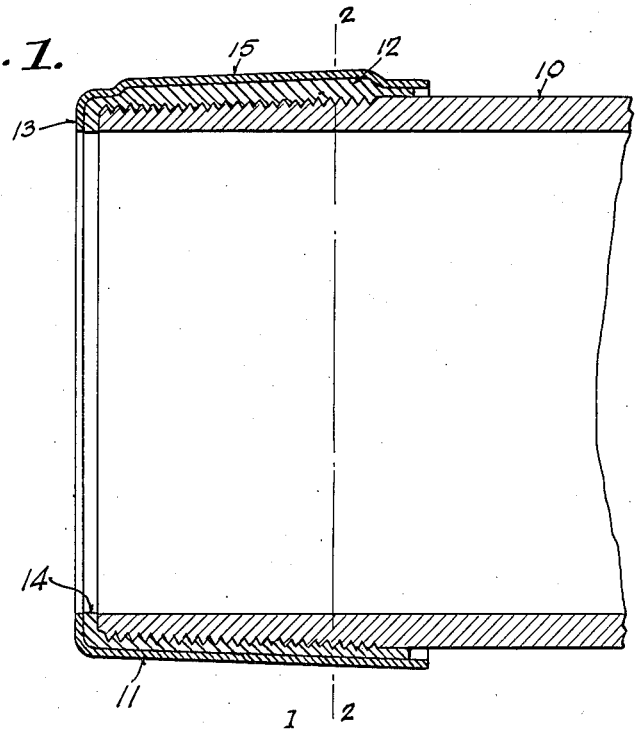
Figure 1 is a longitudinal central section on the line 1—1, Fig. 2, through one end of a threaded pipe equipped with my improved thread protector.

In the drawings, the numeral 10 indicates a section of one end of a pipe, both ends of which will be provided with screw threads.

The numeral 11 indicates a drawn sheet metal shell of slightly larger inside diameter than the pipe, and the numeral 12 indicates a cushioned thread protecting element formed from a sheet of lead, or other soft metal, surrounding the end of the pipe and closely engaging the threads thereof, and constituting a lining for the sheet metal shell 11. The shell is produced with a taper corresponding to that of the threaded end of the pipe. The outer or smaller end of the shell 11 is turned inwardly to form a flange or seat 13, which is adapted to form a stop when it meets the end of the pipe.

The soft metal in sheet form, is inserted as a close fitting lining 12 for the shell 11. The bottom edge of the lining is also inturned as at 14, and is adapted to rest against the inner side of the inturned flange or seat 13 of the shell. When the parts 11 and 12 are assembled as described, the assembly is slipped over the end of the pipe, and radial pressures applied thereto so as to compress the shell and force the inside of the lining to take the form of the threads on the end of the pipe, such threads being buried in the soft metal lining without injury. The close engagement of the flange 14 of the liner, with the end of the pipe, will seal the joint at that point, and act effectively to prevent access of moisture, dirt or sand to the threads, thus protecting the latter from injury by the entry of foreign substance.

Figure 2:
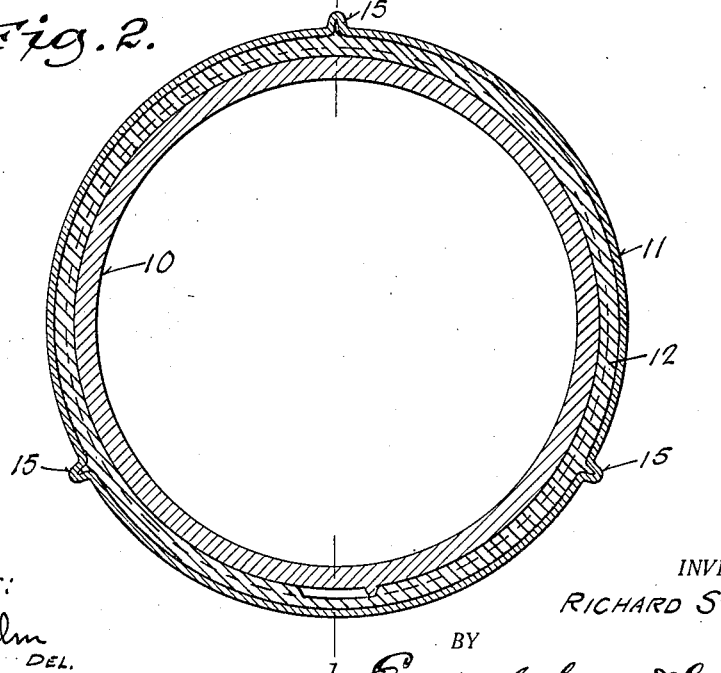
Fig. 2 is a transverse sectional view on the line 2—2, Fig. 1.

In the construction shown in Fig. 2, radial pressures are applied to practically the whole of the outer surface of the shell 11, the dies for exerting such pressure engaging the shell in the compressive movement. Between the ends of each two dies there is an open space in which the radial pressure is not exerted. The contraction of the shell to reduce its diameter, and lack of resistance at the open spaces, causes the metal of the shell and the liner to ooze or flow outwardly between the radial dies, and form a plurality of longitudinally extending exterior ribs 15, with corresponding grooves upon the inside, which are filled in the outward movement of the metal of the liner. The purpose of such ribs, in addition to locking the liner in the shell, is to equip the structure with a means for engagement by a wrench or chain, through which the protecting shell and its lining may be unscrewed from the threaded end of the pipe, or screwed thereon.

The liner at the inner end of the shell should be made to closely embrace an unthreaded band of the pipe, so as to make a tight joint, and exclude injurious substances from entry at that point.

While I prefer to place the shell and its liner upon the threaded end of a pipe and form the threads in the manner described, I may place the shell and its liner on a threaded plug, so as to form the threads in the lining, and then screw the protector upon the end of the pipe.

The arrangement of the soft metal liner intermediate the threads of the pipe and the harder metal shell, contributes greatly to the avoidance of injury to the threads of the pipe by impacts upon the exterior of the shell, for in such circumstances the soft metal liner acts to cushion the blow and absorb the shock without damage to the threads.

Having thus described my invention what I desire to secure by Letters Patent of the United States is:—

1. A pipe thread protector comprising a shell having relatively narrow longitudinally extending ribs upon its exterior and correspondingly grooved at its interior, and a soft metal cushioning liner therefor, the liner having an interlocking engagement upon its outside with the grooves of the ribs to maintain the liner in position in the shell, and adapted to have a threaded engagement upon its inside with a pipe.

2. A pipe thread protector comprising a shell having longitudinally extending ribs upon its exterior and correspondingly grooved at its interior, and a soft metal cushioning liner therefor, the liner having an interlocking engagement upon its outside with the grooves of the ribs to maintain the liner in position in the shell, and adapted to have a threaded engagement upon its inside with a pipe, both the shell and the liner being inturned at one end to form a flange for abutting the end of the pipe to exclude injurious substances from access to the threads thereof.

3. A pipe thread protector comprising a shell having longitudinally extending ribs upon its exterior and correspondingly grooved at its interior, and a soft metal cushioning liner therefor, the liner having an interlocking engagement upon its outside with the grooves of the ribs to maintain the liner in position in the shell, and adapted to have a threaded engagement upon its inside with a pipe, both the shell and the liner being inturned at one end to form a flange for abutting the end of the pipe and extending beyond the threaded portion of the pipe at the other, to exclude injurious substances from access to the threads thereof.

4. The combination of a pipe with a protector for the threaded end thereof, such protector comprising a metal shell extending over the threaded end of the pipe and inwardly thereon to a point beyond said threaded end, and provided with a soft metal liner engaged with the threads of the pipe throughout the full length of the threaded end, the said liner at the inner end of the shell closely embracing an unthreaded band of the pipe so as to make a tight joint and exclude injurious substances from entering at the corresponding end of the protector.

5. The combination of a pipe with a protector for the threaded end thereof, such protector comprising a metal shell extending over the threaded end of the pipe and inwardly thereon to a point beyond said threaded end, and provided with a soft metal liner engaged with the threads of the pipe throughout the full length of the threaded end, the said liner at the inner end of the shell closely embracing an unthreaded band of the pipe, the liner and shell being inturned at the outer end of the pipe to form flanges which are seated against the end of the pipe, to prevent the entry of injurious substances at either end of the threaded portion.

6. The combination of a pipe with a protector for the threaded end thereof, such protector comprising a metal shell extending over the threaded end of the pipe and inwardly thereon to a point beyond said threaded end, and provided with a soft metal liner engaged with the threads of the pipe throughout the full length of the threaded end, the liner and shell being inturned at the outer end of the pipe to form flanges which are seated against the end of the pipe, to prevent the access of injurious substances to the threads of the pipe.

7. The combination of a pipe with a protector for the threaded end thereof, the said protector comprising an unbroken tubular shell of sheet metal provided with a liner of soft metal forced into engagement with the threads of the pipe by contraction of the shell along a line extending longitudinally of the pipe, the liner extending beyond the threaded portion of the pipe to prevent access of injurious substances to the threads.

In testimony whereof, I have signed my name at Milwaukee, Wisconsin, this 28th day of October, 1927.

R. STRESAU.